United States Patent [19]
Small et al.

[11] Patent Number: 5,944,574
[45] Date of Patent: *Aug. 31, 1999

[54] INTERACTIVE AUDIO-VISUAL TOY

[75] Inventors: David Small, San Jose; Paul S. Rago, Alamo; Brian Farley, Danville, all of Calif.

[73] Assignee: Shoot the Moon Products, Inc., Pleasanton, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/682,266

[22] Filed: Jul. 17, 1996

[51] Int. Cl.⁶ .................................................. G09B 5/06
[52] U.S. Cl. ......................... 446/149; 446/408; 434/311
[58] Field of Search .................... 446/147, 149, 446/151, 408; 434/308, 309, 311

[56] References Cited

U.S. PATENT DOCUMENTS

| | | |
|---|---|---|
| D. 315,178 | 3/1991 | Takahashi et al. ............ D21/64 |
| 1,269,968 | 6/1918 | Small . |
| 1,821,184 | 9/1931 | Langos . |
| 1,831,817 | 11/1931 | McGill et al. . |
| 2,003,765 | 6/1935 | Widen . |
| 2,064,115 | 12/1936 | Holsman . |
| 2,102,243 | 12/1937 | Van Deventer et al. . |
| 2,608,778 | 9/1952 | O'Gorman . |
| 3,029,683 | 4/1962 | Zaromb ........................ 434/309 |
| 3,114,216 | 12/1963 | Crawford et al. . |
| 3,319,357 | 5/1967 | Shreck et al. .................. 434/308 |
| 3,388,499 | 6/1968 | Mercorelli . |
| 3,458,950 | 8/1969 | Tomaro . |
| 3,590,525 | 7/1971 | Tomaro . |
| 3,882,620 | 5/1975 | Grindle . |
| 3,884,565 | 5/1975 | Tanno ........................... 434/308 |
| 3,939,579 | 2/1976 | Andrews et al. . |
| 4,079,431 | 3/1978 | Marut ........................... 434/308 |
| 4,215,511 | 8/1980 | Todokoro . |
| 4,373,918 | 2/1983 | Berman ......................... 434/307 |
| 4,555,859 | 12/1985 | Corso ........................... 434/308 |
| 4,637,007 | 1/1987 | Sakurai ......................... 446/297 |
| 4,639,225 | 1/1987 | Washizuka .................... 434/308 |
| 4,668,060 | 5/1987 | Jones et al. .................... 353/15 |
| 4,684,349 | 8/1987 | Ferguson et al. ............. 434/308 |
| 4,855,725 | 8/1989 | Fernandez .................... 434/308 |
| 5,032,099 | 7/1991 | Chan . |
| 5,065,345 | 11/1991 | Knowles et al. .............. 434/308 |
| 5,145,447 | 9/1992 | Goldfarb ....................... 446/408 |
| 5,233,333 | 8/1993 | Borsuk .......................... 434/317 |
| 5,236,364 | 8/1993 | Caparosa ...................... 434/308 |
| 5,266,980 | 11/1993 | Gussin et al. ................. 353/19 |
| 5,310,377 | 5/1994 | Joja .............................. 446/397 |
| 5,413,486 | 5/1995 | Burrows et al. .............. 434/308 |
| 5,474,457 | 12/1995 | Bromley ....................... 434/311 |

FOREIGN PATENT DOCUMENTS

| | | | |
|---|---|---|---|
| 2573905 | 5/1986 | France ......................... 434/308 |
| 993970 | 6/1965 | United Kingdom ......... 434/309 |
| 1100606 | 1/1968 | United Kingdom ......... 434/308 |

Primary Examiner—Robert A. Hafer
Assistant Examiner—Jeffrey D. Carlson
Attorney, Agent, or Firm—Blakely, Sokoloff, Taylor & Zafman LLP

[57] ABSTRACT

An interactive audio-visual toy that includes a base unit that receives removable audio-visual ("AV") cassette. The AV cassette includes a pair of rollers on which a picture scroll is wound. The pictorial scenes of the picture scroll are evident through a transparent viewing window. Moreover, a pre-recorded audio cassette is mounted on its bottom surface. The base unit controls the AV cassette to successively display these pictorial scenes without the use of expensive display hardware and to output audio from the pre-recorded audio cassette tape.

29 Claims, 4 Drawing Sheets

INTERACTIVE AUDIO-VISUAL TOY

BACKGROUND OF THE INVENTION

1. Field of the Invention

The present invention relates to the field of electronic toys. More particularly, the present invention relates to a cost-effective interactive toy that displays successive pictorial scenes and concurrently outputs audio to prompt interactive participation by the user.

2. Description of Art Related to the Invention

Over the last few decades, designers in the toy field have developed many types of audio-visual toys. An audio-visual toy is defined as a device that concurrently (i) produces one or more pictorial scenes in succession and (ii) outputs audio that narrates a portion of a featured story represented by the pictorial scene. For example, there exists audio-visual toys that produce continuous pictorial scenes accompanied by audio, without soliciting any active participation by the user. These toys operate as story-telling devices and may not be used as interactive, educational tools. Another type of audio-visual toy provides a number of discrete pictorial scenes, each of which is successively displayed after a predetermined period of time has elapsed. However, this time period is not adjustable precluding a child from actively participating in the story according to his or her own level of understanding.

Albeit some audio-visual toys are "interactive" by allowing its user to actively participate in selecting narrative portions of the featured story, they may suffer from a number of disadvantages.

One disadvantage is that conventional interactive audio-visual toys are expensive which prevents adults of modest means from purchasing these toys for their children. The expensive nature of the interactive toys are due partially to the requirement that a costly display monitor (e.g., projection equipment, cathode ray tube, a flat panel display, etc.) and associated circuitry is needed to display the pictorial scene for the user.

Another disadvantage is that conventional interactive audio-visual toys usually are heavy and cumbersome. This characteristic prevents such interactive audio-visual toys from being truly portable.

Yet another disadvantage is that most conventional interactive audio-visual toys are too complex for young children to set-up or use. Such complexity may discourage the child from using the audio-visual toy.

Still another disadvantage is that conventional interactive audio-visual toys are designed with multiple independent components working in collaboration. This increases the likelihood that the toy may be inoperable if one of the components becomes damaged or lost.

SUMMARY OF THE INVENTION

An interactive audio-visual toy that includes a base unit that receives a removable audio-visual ("AV") cassette used to convey a featured story having a number of selectable story lines. The base unit controls the AV cassette to successively display the pictorial scenes without the use of expensive display hardware and associated circuitry or equipment and to output audio from a pre-recorded audio cassette tape mounted onto the bottom side of the AV cassette. This interactive audio-visual toy is portable for entertaining the child in and away from one's residence.

BRIEF DESCRIPTION OF THE DRAWINGS

The features and advantages of the present invention will become apparent from the following detailed description of the present invention in which.

DESCRIPTION OF THE PREFERRED EMBODIMENT

The following description sets forth a preferred embodiment of the present invention in order to enable any person skilled in the mechanical or electrical toy fields to make and use the invention. It is contemplated, however, that various modifications of the present invention may be readily apparent to those skilled in the art. Therefore, the spirit and scope of the present invention should be based on the claims presented below.

Figure 1:
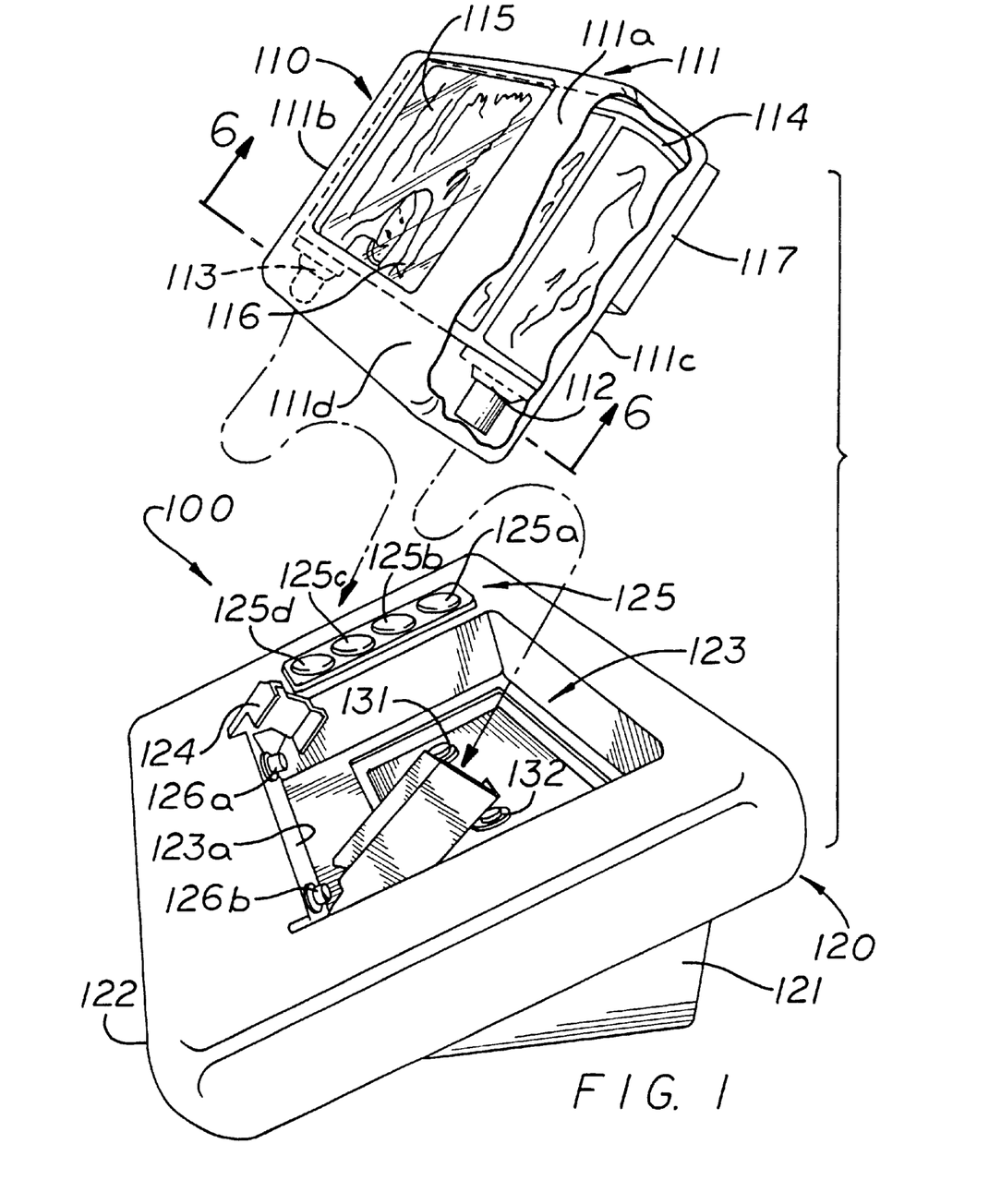
FIG. 1 is a perspective view of an embodiment of a fully assembled audio-visual toy comprising a removable audio-visual ("AV") cassette and a base unit.

Referring to FIG. 1, a perspective view of one embodiment of the interactive audio-visual toy 100 being loaded is shown. The interactive audio-visual toy 100 includes a removable audio-visual ("AV") cassette 110 and a base unit 120 which controls the operations performed to the AV cassette 110. The AV cassette 110 may be replaced with another AV cassette featuring a different featured story (e.g., an animated fictional or non-fictional story, an educational lesson, etc.).

Having a size approximately equal to a VHS tape, the AV cassette 110 includes a casing 111, enclosing a pair of rollers 112 and 113 on which a picture scroll 114 is wound. Preferably made of hardened plastic, the casing 111 has a top surface 111a with a transparent viewing window 115 made of a clear plastic. The sizing of the transparent viewing window 115 is sufficient to allow the user to view at least one pictorial scene 116 (e.g., a drawing visually conveying a portion of a story) printed on the picture scroll 114 as it is indexed to display a featured story. The pictorial scene 116 may also include indicia (e.g., numbers, letters, images, etc.) proximate to or under interactive control buttons 125a–125d.

Implementing multiple medium types (e.g., visual and audio) into a single unit poses a number of advantages such as, for example, increasing durability and mitigating the difficulty of loading and unloading the AV cassette 110. Moreover, additional advantages include, but are not limited to, ensuring that the audio and its corresponding featured story are being played together, or maintaining the audio and pictorial scenes in relative sync during non-use in order to avoid long synchronization waiting periods.

With respect to the mechanism of the AV cassette 110 providing the pictorial scenes, the picture scroll 114 is a long strip of material, preferably paper or any substantially non-translucent material, having a number of different pictorial scenes 116 printed thereon. It is contemplated, however, that the material may be translucent (e.g., acetate), provided a backlight is appropriately implemented within the base unit described below. Collectively, these pictorial scenes 116 portray a historical event, a widely known fictional story (e.g., a popular animated story created and produced by Walt Disney Company of Burbank, Calif.) or the like. Each end of the picture scroll 114 is coupled to a respective one of the rollers 112 and 113 which are supported for rotation on generally opposite sides 111b and 111c of the casing 111, respectively. As a result, at least one of the pictorial scenes may be positioned in face to face disposition with respect to the viewing window 115 and top surface 111a of the AV cassette 110.

With respect to the mechanism of the AV cassette 110 providing audio, a conventional audio cassette tape 117, pre-recorded with audio information complementary to the pictorial information on scroll 114, is flexibly mounted on a bottom surface 111d of the casing 111. This flexible mounting allows easy insertion and removal of the audio cassette tape 117 from the base unit 120.

Typically, a conventional audio cassette tape will have four parallel tracks or channels, two recorded to provide stereo playback when played in one direction, and the other two recorded to provide an independent stereo playback when played in the opposite direction by turning the cassette over and playing the tape again as it is rewound to its original condition. Proper placement of the two channel record and playback head with respect to the tape provides proper head alignment with respect to each pair of the four tracks on the tape without readjustment of head position.

Figure 3:
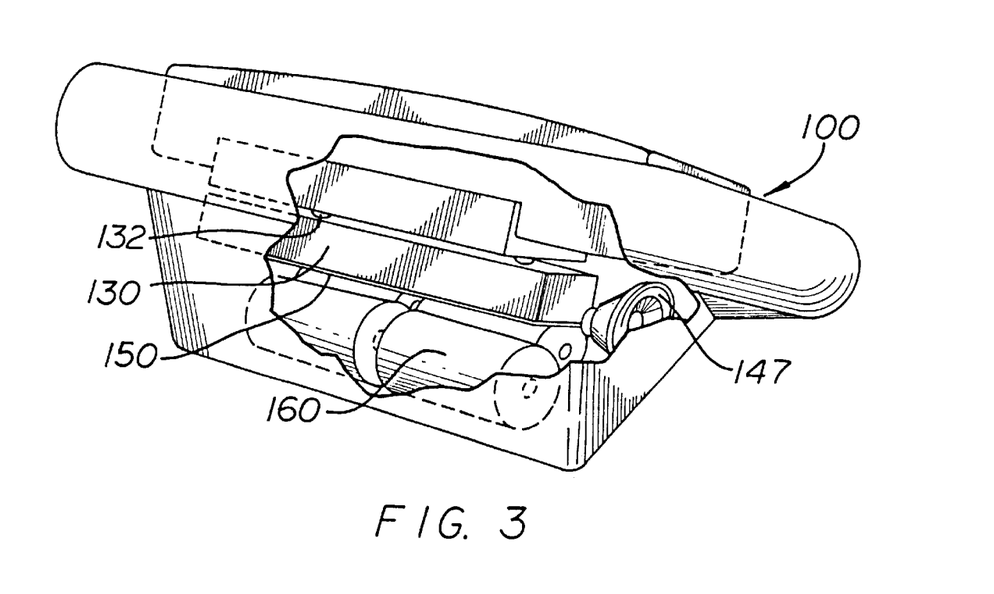
FIG. 3 is a cut-away rear view of the fully assembled, interactive audio-visual toy illustrating devices implemented within a stand portion of the base unit.

In the present invention, the audio cassette tape 117 also features a plurality of parallel tracks (i.e., channels). However, for example, the audio cassette tape 117 may be configured to include four parallel channels, with cooperatively disposed read heads in the base unit 120 to read all four channels at once during the forward motion of the tape, and play back one of the four channels through speaker 140 (FIG. 3). A primary individual channel or track may be selected as a default at the beginning of the featured story, or during operation. The selected channel provides a particular story line of the featured story. The presence of multiple channels allows the AV cassette 110 to contain and provide many different story lines of the same featured story. These different story lines may have slightly-different plots, or may involve a narration from different perspectives (e.g., from different characters of the featured story). It is contemplated that such channel selection may be performed through coding by frequency modulation or other well-known techniques preferably directly detectable by a microcontroller or processor of the interactive audio-visual toy.

These channels may be arranged in a number of configurations. For example, one type of configuration is that a first channel is used to control the beginning and ending of a narrative audio segment associated with a particular pictorial scene and signals indexing of the picture scroll while the other channels contain recorded audio information. Other types of completed configurations may include adapting all of the channels to (i) include audio information with buried control signals producing a tone pulse within an inaudible range (i.e., out of the bandpass range of audible sound) to signal a controller to advance the picture scroll 114 to the next pictorial scene, or (ii) include control and audio information appropriately recorded at specific locations on its channel. Particularly in the later configuration, a single adjustable read head could alternatively be used, with the channel being played at any one time by selectably positioning of the head across the tape.

As shown, the audio cassette tape 117 is controlled by an audio cassette drive mechanism 130 in the base unit 120 deployed as a bottom surface of an AV cassette slot 123. The audio cassette drive mechanism 130 features two drive pins 131 and 132 to rotate the take-up reels (not shown) of the audio cassette tape 117 to play or rewind the tape 117.

As further shown in FIG. 1, the base unit 120 comprises a stand portion 121 and a planar portion 122 which is coupled to the stand portion 121 and set at an acute angle from a surface (floor, lap, etc.) upon which the stand portion 121 is situated. The planar portion 122 includes (i) the AV cassette slot 123, (ii) a widely-used cassette loading device 124 pivotably coupled to a first side 123a of the AV cassette slot 123 and configured to receive and properly load the AV cassette 110 into the AV cassette slot 123 and (iii) an interactive control panel 125 having a plurality of interactive control buttons 125a–125d being arbitrary in number.

The plurality of interactive control buttons 125a–125d may be made of an non-translucent material (e.g., plastic) having indicia printed thereon, or made of translucent or transparent material (e.g., clear plastic) allowing certain indicia printed on the picture scroll to be visible therethrough. Thus, audio does not have to identify all of the selections, but rather allows the user to make a selection based on the indicia presented to him or her.

When the control buttons 125a–125d are depressed, they indicate the interactive responses by the user. For example, upon depressing one of the interactive control buttons (e.g., a first interactive control button 125a), it signals the audio cassette drive mechanism 130 of the base unit 120 to play a particular channel of the audio cassette tape 117, which may slightly alter the narrative story.

Figure 2:
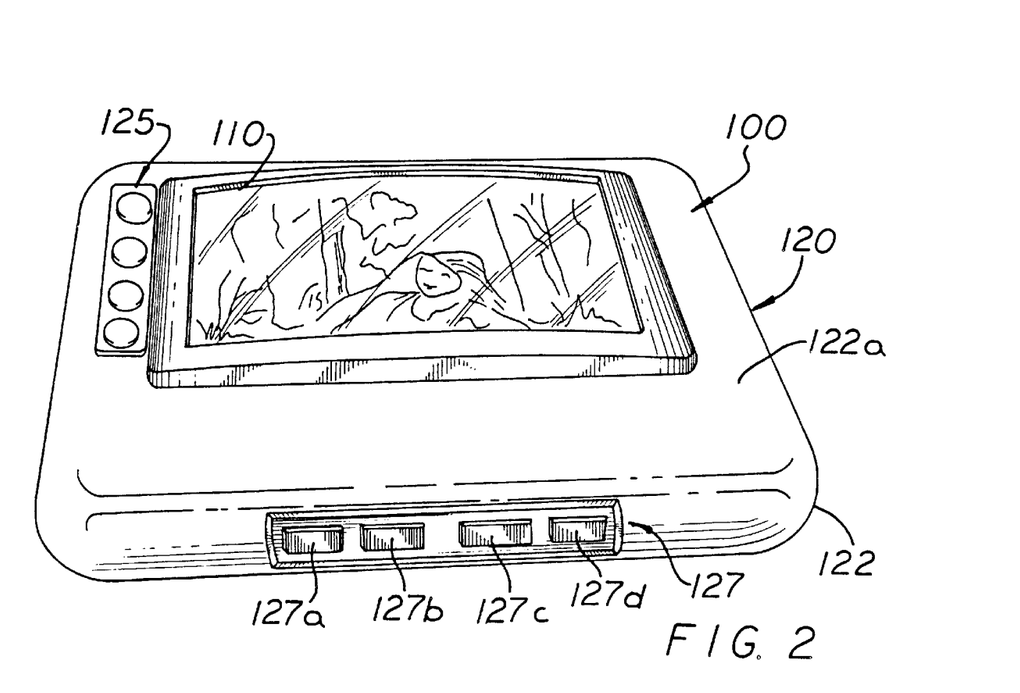
FIG. 2 is a perspective view of the fully assembled interactive toy of FIG. 1 with the AV cassette loaded into the base unit that automatically indexes the picture scroll for displaying pictorial scenes through a transparent viewing window of the AV cassette.

In addition, protruding from the first side 123a of the AV cassette slot 123 are a pair of scroll drive pins 126a and 126b spaced apart so that the scroll drive pins 126a and 126b in an AV cassette 110 are aligned with and rotationally coupled to the rollers 112 and 113 after the AV cassette 110 is loaded into the AV cassette slot 123. These scroll drive pins 126a and 126b engage the rollers 112 and 113 in an AV cassette 110 as the cassette is slid into the cassette carrier 124 prior to the cassette carrier being rotated downward to the cassette loaded position, such as is shown in FIG. 2. The scroll drive pins 126a and 126b are motor driven to appropriately rotate the rollers 112 and 113 in a clockwise or counter-clockwise direction to index or rewind the picture scroll 114.

Referring now to FIG. 2, the face and lower edge of the interactive audio-visual toy 100 of FIG. 1 may be seen. The AV cassette 110 has been inserted into the AV cassette carrier on the base unit 120 and then rotated downward to lie generally flush with a top surface 122a of the planar portion 122. The base unit 120 further includes a cassette control panel 127 having a plurality of cassette control buttons 127a–127d that control the operations of the AV cassette 110. These four cassette control buttons 127a–127d operate as "Eject", "Stop", "Play" and "Rewind", respectively. It is contemplated that additional cassette control buttons may be implemented to provide additional control features or a single cassette control button may be used to provide multiple functions such the "Eject" and "Stop" features. The mechanisms controlling these functions are well know in the audio cassette player prior art, and therefore are not further described herein.

Figure 5:
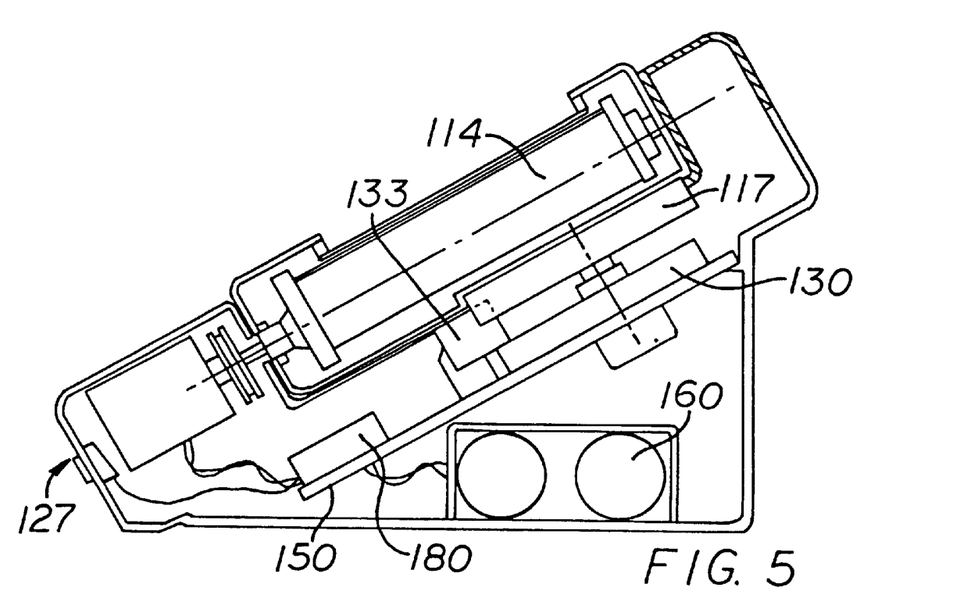
FIG. 5 is a cross-sectional view of the fully assembled, interactive audio-visual toy taken along lines 5—5 of FIG. 4.

Referring now to FIG. 3, a cut-away view of the fully-assembled, interactive audio-visual toy 100 is shown. The stand portion 121 houses (i) the audio cassette drive mechanism 130 coupled to a printed circuit board 150 and proximate to the AV cassette slot and (ii) an audio speaker 147. The drive pins 131 and 132 of the audio cassette drive mechanism 130 engage the reels of the audio cassette tape 117 when the AV cassette 110 is inserted into the AV cassette carrier 124 (FIG. 1). The audio cassette drive mechanism 130 includes the read heads to read recorded information (e.g., audio and/or control) from the tape and couple the information to a control circuitry (illustrated as 180 in FIG. 5) coupled to the printed circuit board 150. Depending on the format of the information, it may be converted (if recorded as digital information) or simply routed (if recorded as analog information) to the audio speaker 140 which produces audible audio.

The stand portion 121 further houses a power supply 160 and a pictorial drive control mechanism (shown in FIG. 4) to control the indexing of the picture scroll. The power supply 160 may include, but is not limited to, a number of D-cell batteries as found in conventional toys to provide portability. It is contemplated, however, that the power supply may also include an AC-DC adapter to convert AC power from a source (e.g., a wall-socket) into low voltage DC power if the interactive audio-visual toy 100 is being used within a residence to conserve battery power.

Figure 4:
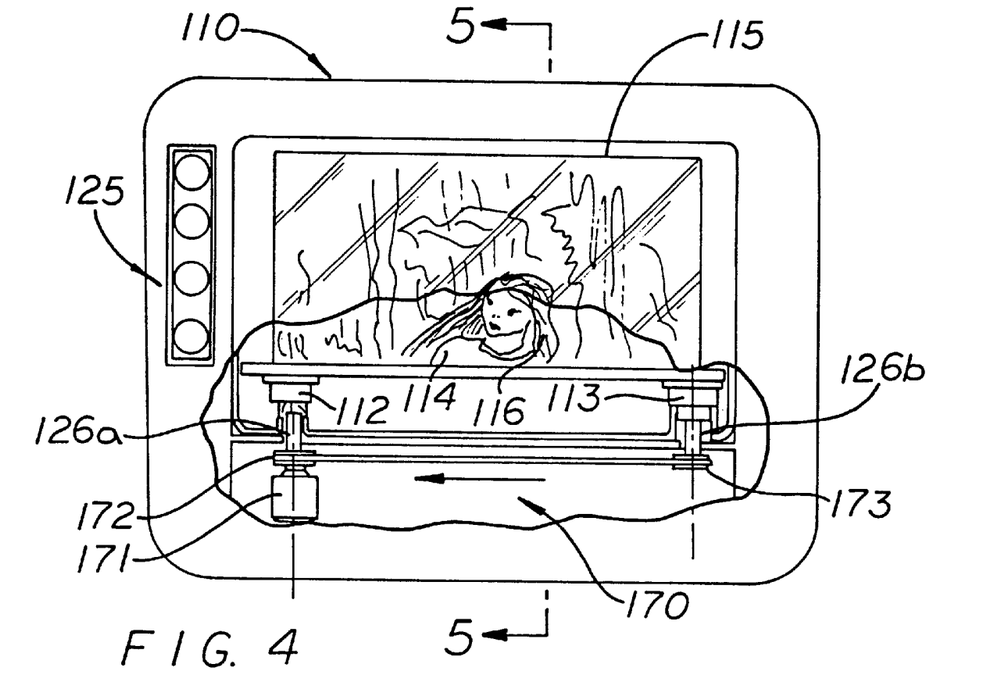
FIG. 4 is a cut-away face view of the fully assembled, interactive audio-visual toy illustrating the pictorial drive control mechanism that controls the rotation of the rollers used to index the picture scroll.

Referring now to FIG. 4, a cut-away face view of the fully assembled, interactive audio-visual toy 100 illustrating the pictorial drive control mechanism that controls the automatic rotation of the rollers 112 and 113 for indexing the picture scroll 114 may be seen. It is contemplated that any well-known pictorial drive control mechanism may be employed in the interactive audio-visual toy 100, provided the unwinding of the picture scroll 114 from the first or second roller 112 or 113 is equal to the amount of picture scroll 114 wound by the second roller 113 or first roller 112, respectively.

As shown in FIG. 4, the pictorial drive control mechanism 170 of this embodiment includes a motor 171 (which could be a stepper motor or a small gear motor) rotationally coupled to a first pulley 172. The first pulley 172 is rotationally coupled to the scroll drive pin 126a through a one-way drive which disengages if the first pulley 172 is driven in the clockwise direction, and is further coupled to a belt 173 to drive a second pulley 174 to rotate the scroll drive pin 126b through an opposite direction one-way drive which disengages if the second pulley is driven in the counterclockwise direction. The direction of motor rotation and its powered duration are controlled by a controller as described for FIG. 5 and subsequently for FIG. 8.

The operations of the pictorial drive control mechanism for automatic pictorial scene indexing (as well as manual pictorial scene indexing) are as follows. When the controller needs to index the picture scroll 114, it applies power to the motor in the proper polarity to determine its rotational direction. In response, the motor 171 may rotate the first pulley 172 in a clockwise rotational direction. This causes the first pulley 172 to rotate the belt 173 coupling the first and second pulleys 172 and 174 in the clockwise rotational direction. The one-way drive to scroll drive pin 126a however, disengages, and does not rotate the first roller 112 in the clockwise rotational direction. Instead, the belt 173 rotates the second pulley 174 in the clockwise rotational direction which, in turn, rotates the second roller 113 through the respective one-way drive. Hence, pictorial scene 116 printed on the picture scroll is rolled up on and indexed toward the second roller 113. This unwinds the picture scroll 114 from the first roller 112 against a slight drag to maintain a slight tension in the scroll to allow another pictorial scene to be seen through the viewing window 115. Reversal of the polarity of power on the motor will cause the scroll to similarly be rolled in the opposite direction.

The duration in which the motor is allowed to rotate the rollers 112 and 113 may be a specific time period, or so long as a scroll advance control button is pushed. However, it is preferred that the duration be controlled by sensor(s) employed within the base unit 120.

Figure 6:
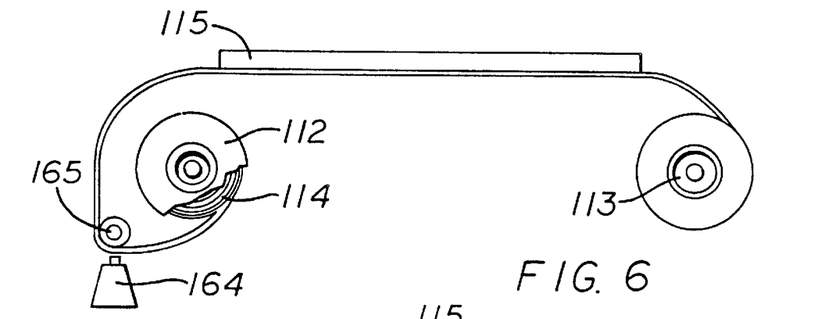
FIG. 6 is a cross-sectional view of the AV cassette taken along lines 6—6 of FIG. 1 to illustrate the propagation path of the picture scroll.

An exemplary sensing system is shown in FIG. 6. Here a light source/optical sensor 164 is shown below the AV cassette near the edge thereof, monitoring the picture scroll as the same is taken up or played out from one of the scroll reels. The sensor 164 is monitoring the printed side of the picture scroll, but at a longitudinal edge thereof not viewable through the viewing window 115 (FIG. 1). An idle roller 165 of the AV cassette 110 is situated in line with the scrolling of the picture scroll 116 and opposite the sensor 164. Thus, codes may be printed along this longitudinal edge of the scroll in flat black and white and read by the sensor 164 as the scroll is advanced or rewound to command the stopping of the scroll at each predetermined position. The codes would typically include a stop code at each desired scroll stopping position, and a screen identification code to identify the screen to assure synchronization of the audio with the screen by the control circuitry 180. As an example, a bar code may be printed near an edge of the picture scroll 114 to be read by a bar code sensor to signal the controller to identify the screen and discontinue supplying power to the motor at the proper position.

Referring back to FIG. 5, a cross-sectional view of the fully assembled, interactive audio-visual toy taken along lines 5—5 of FIG. 4 is shown. Mounted on the printed circuit board 150, the controller 180 (e.g., microprocessor, micro-controller or any appropriate controlling device) transfers control signals to the audio cassette drive mechanism 130 in response to control signals received from the interactive control panel 125, the cassette control panel 127, the sensor 164 (if implemented) and/or the control (tone) signals on the audio cassette itself.

Figure 7:
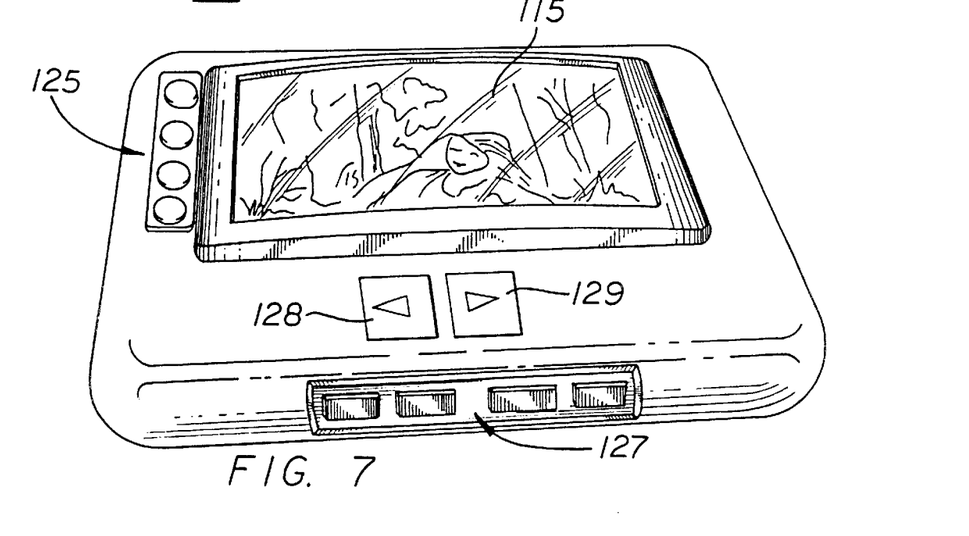
FIG. 7 is a perspective view of a second embodiment of a fully assembled, interactive audio-visual toy utilizing a manual pictorial scene indexing scheme.

Although automatic indexing of the picture scroll through sensor-related mechanisms is preferred, it is contemplated that manual pictorial scene indexing is be used by implementing scene index buttons 128 and 129 as shown in FIG. 7. When depressed by the user, the scene index buttons 128 and 129 index the picture scroll 114 to adjust a pictorial scene 116 to be visible through the viewing window 115. The user is told when to index the picture scroll 114 through pre-recorded audio messages on the audio cassette tape. Unnecessary to manual pictorial scene indexing, the audio cassette tape does not require control information placed on its channels. Moreover, the controller powers and signals the motor to rotate the first and second rollers, based on control signals from circuitry associated with the scene index buttons, rather than the audio cassette drive mechanism.

Figure 8:
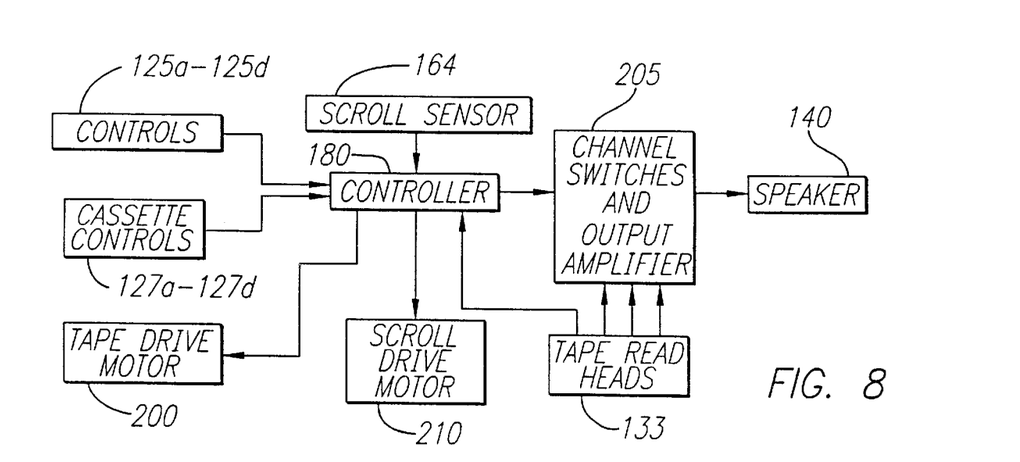
FIG. 8 is a block diagram of the overall control system of an exemplary embodiment of the present invention.

Now referring to FIG. 8, a block diagram of the overall control system of an exemplary embodiment of the present invention may be seen. As shown therein, a micro-controller receives simple switch input signals from cassette controls 125a through 125d, or at least some of them, which indicate that the AV cassette is properly positioned in the base unit and that the PLAY button has been depressed so that the capstan and read heads appropriately engage the cassette tape. Either upon such engagement, or alternatively, upon pressing any of the controls 125a through 125d, the controller 180 would typically start the tape drive motor 200 and connect one of the three audio outputs from the tape read heads through one of the channel switches and the output amplifier 205 to the speaker 140 to provide an introduction to the audio visual program to be presented. Alternatively, three different introductions could be used with controls 125a through 125d determining which of the three is output to the speaker 140. After the introduction, as determined by the controller 180 sensing appropriate commands on the control channel of the audio cassette tape, the scroll drive motor 210 would be turned on to advance the scroll one scene, to be turned off when the scroll sensor 164 senses the scroll arriving at the desired stopping point. During this time, the tape drive motor 200 may be continued to provided a continuous output during the scroll advancing, perhaps after the scroll stops presenting a question to the child with respect to something in the scene being viewed. In the exemplary embodiment, the cassette tape would then stop, awaiting the child's response through the controls 125a–125d. For instance, the question may be, "How many birds do you see in the picture?", with the number "1" showing on the scroll in front of control 125a, number "2" showing on the scroll in front of control 125b, etc. If the child pushes the button associated with the right answer, the controller 180 would turn on the scroll drive motor and the tape drive motor 200, and select the appropriate setting of the channel switches to select the channel introducing the next scene. If the child pushes a control button associated with the wrong answer, the tape drive motor 200 and scroll drive motor 210 may again both be turned on, though the channel switches set to select a different audio channel which indicates what the correct answer was, and why, and also introduces the next scene, perhaps in a somewhat more abbreviated manner than if the correct answer was given.

Alternatively, if the tape drive has a reversing capability with the capstan still engaged, the selection of the wrong answer might elicit a fast rewind and the playing of one of the other channels through the speakers explaining why the answer was wrong and inviting another attempt. Even without such a reversing capability, which would be difficult to implement inexpensively, it is possible to still give the child one or more further attempts before going on. By way of example, if the right answer is given, the tape might be turned on to play a song or tell some short supplemental story before or after advancing the scroll. Such an additional story line, a song or whatever, would provide enough time to explain on the other channels why a particular wrong answer selected was incorrect and to elicit another try by the child one or more times. (Audio tape stopping points may be keyed not only to commands in the control channel, but can be dependent also on the answer the child gave.) Thus, the same objective is achieved, simply by appropriate programming of material on the audio tape without the complexity of audio tape drive reversal capabilities.

It can be seen from the foregoing that the toy is interactive with the child, encouraging, even requiring interaction which maintains the child's attention and which can have an educational value. Obviously the type of interaction called for can be made highly dependent upon the programming material on the audio cassette associated with the AV cassette. By way of example, each scene on the scroll might have multiple characters, with the child choosing a character in each scene to hear a story line segment, description, etc. associated with that character. Alternatively, the child might be told that a particular song is to be sung by the character and asked to choose (through controls 125) the character the child would like to have lead the song. The variations achievable are essentially endless, with only a few examples having been given herein.

The ability of the scroll sensor to sense not only each appropriate scroll stopping point, but the scene identification also, allows the micro-controller to compare the scroll position with the command information being read from the respective channel of the audio tape so that the micro-controller can assure that the scroll and the tape are always in step with each other. In a simpler embodiment, the scroll sensor might only sense each scroll stopping position by way of a very crude mechanical or optical sensor, or for that matter, even a manually controlled scroll advance switch might be used. In such a system, the controller shown in FIG. 8 could be replaced with simple hardwired circuitry so that between each scene the tape channel corresponding to the respective control 125 pushed by the child is played back. Finally, as an intermediate embodiment, the control channel on the tape and the scroll sensor are both used to coordinate the operation of the scroll and tape, but without the ability to sense lack of synchronism between the two, as might occur because of the partial rewinding of the AV cassette resulting in the scroll stopping at a position different from the corresponding story line segment that the audio cassette stopped at during the rewind.

Thus, it may be seen that the present invention may be realized in various embodiments ranging from relatively simple embodiments to more complicating embodiments, assuring the desired synchronization of, and the desired child interaction with, the invention. While various embodiments have been disclosed and described in detail herein, it will be understood by those skilled in the art that various changes in form and detail may be made therein without departing from the spirit and scope of the invention.

What is claimed is:

1. An audio-visual cassette comprising:
    a plurality of rollers including a first-roller and a second roller;
    a picture scroll including a plurality of pictorial scenes, a first end of said picture scroll being coupled to said first roller and a second end of said picture scroll being coupled to said second roller;
    an audio cassette tape including a magnetic tape having pre-recorded audio which is complementary with said plurality of pictorial scenes on said picture scroll, the magnetic tap being rotated during playback, around at least one as of rotation generally orthogonal to the plurality of rollers; and
    a removable casing providing a unitary unit that includes (i) the audio cassette tape, (ii) the picture scroll, and (iii) the plurality of rollers, the casing including a transparent viewing window located on a front surface to allow a pictorial scene of the plurality of pictorial scenes to be visible.

2. The audio-visual cassette according to claim 1, wherein said audio cassette tape is permanently attached to a rear surface of the casing.

3. The audio-visual cassette according to claim 1 further including an idle roller operating in combination with said plurality of rollers.

4. The audio-visual cassette according to claim 1, wherein said picture scroll is made of non-translucent material having said plurality of pictorial scenes printed thereon.

5. The audio-visual cassette according to claim 1, wherein said pictorial scene of said plurality of pictorial scenes is displayed in synchronism with playback of a segment of said pre-recorded audio corresponding to said pictorial scene.

6. The audio-visual cassette according to claim 5, wherein said magnetic tape includes a plurality of parallel channels of which at least one channel is used to control playback of said pre-recorded audio and at least one channel contains said pre-recorded audio.

7. The audio-visual cassette according to claim 5, wherein said magnetic tame includes a plurality of parallel channels of which a first channel of said plurality of parallel channels is used to control playback of said pre-recorded audio and to contain said pre-recorded audio.

8. The audio-visual cassette according to claim 5, wherein said magnetic tape includes a plurality of parallel channels of which a first channel of said plurality of parallel channels is selected as a default channel to playback said pre-recorded audio according to a first story line.

9. The audio-visual cassette according to claim 8, wherein a second channel of said plurality of parallel channels is selected as said default channel to playback said pre-recorded audio according to a second story line.

10. The audio-visual cassette according to claim 1, wherein said picture scroll includes codes printed on one of its longitudinal edges, said codes are solely used to control the display of said plurality of pictorial scenes in synchronism with said pre-recorded audio.

11. The audio-visual cassette according to claim 1, wherein said picture scroll includes a translucent material having said plurality of pictorial scenes printed thereon.

12. A base unit, controlling display of pictorial scenes and playback of audio corresponding to the pictorial scenes of a unitary, removable audio-visual cassette including a picture scroll, having a plurality of scones depicted thereon, wound around one of a plurality of rollers, and an audio cassette tape, having a pair of take-up reels, mounted on a rear side of the audio-video cassette, comprising;

a controller;

a pictorial drive control mechanism coupled to said controller, said pictorial drive control mechanism controls the display of the pictorial scenes through rotation of at least one of the plurality of rollers around a first axis;

an audio cassette drive mechanism coupled to said controller, said audio cassette drive mechanism is responsive to control signals from said controller to select a channel from the audio cassette tape to be played and to rotate at least one drive pin about an axis generally orthogonal to said first axis causing rotation of the pair of take-up reels during playback of the audio cassette tape;

an audio speaker coupled to said audio cassette drive mechanism, said audio speaker outputs audible sound based on said channel selected by said audio cassette drive mechanism; and a housing for said pictorial drive control mechanism, said housing providing a first slot sized for insertion of the audio cassette tape of the audio-visual cassette.

13. The base unit according to claim 11, wherein said pictorial drive control mechanism includes a plurality of drive pins rotatably engaged with the plurality of rollers to index the picture scroll;

a rotating mechanism coupled to said plurality of drive pins, said rotating mechanism being used to rotate said plurality of drive pins; and a motor coupled to said rotating mechanism, said motor being used to drive said rotating mechanism to rotate said plurality of drive pins to display the pictorial scenes.

14. The base unit according to claim 13, wherein said rotating mechanism includes a plurality of pulleys coupled to said plurality of drive pins; and a belt engaged with said plurality of pulleys, said belt drives said plurality of pulleys to rotate said plurality of drive pins.

15. The base unit according to claim 13, wherein said pictorial drive control mechanism further includes a sensor coupled to said controller, said sensor being mounted within the base unit to monitor a longitudinal edge of the picture scroll and to transmit a control signal to said controller which, in turn, applies power to said motor to advance the picture scroll to display a subsequent pictorial scene.

16. The base unit according to claim 13, wherein said pictorial drive control mechanism further includes a plurality of scene index buttons which, upon being depressed, transmit a control signal to said controller to power said motor to index the picture scroll.

17. The base unit according to claim 16, wherein a first button of said plurality of scene index buttons, upon being depressed, transmits a first control signal to said controller to power said motor to advance said picture scroll and a second button of said plurality of scene index buttons, upon being depressed, transmits a second control signal to said controller to power said motor to rewind said picture scroll.

18. The base unit according to claim 11, wherein said audio cassette drive mechanism includes a tape drive motor;

a pair of tape drive pins coupled to said tape drive motor, said pair of tape drive pins rotate said take-up reels of the audio cassette tape; and at least one read tape head to obtain audio information from the audio cassette tape and transfer said audio information to said controller for playback.

19. The interactive toy according to claim 16, wherein said audio-visual cassette further includes a plurality of rollers substantially contained within said casing, said plurality of rollers includes a first roller coupled to a first end of said picture scroll and a second roller coupled to a second end of said picture scroll; and an idle roller positioned adjacent to one of said first roller and second roller, said idle roller removes slack in said picture scroll during operation of the interactive toy.

20. An interactive toy comprising:

a base unit; and a removable audio-visual cassette being inserted into said base unit, said audio-visual cassette including a plurality of rollers, a picture scroll coupled to the plurality of rollers and including a plurality of pictorial scenes, an audio cassette tape including a pair of take-up reels wound with magnetic tape having pre-recorded audio complementary with said plurality of pictorial scenes on said picture scroll, the pair of take-up reels being rotated around an axis orthogonal to the rollers during playback; and a casing providing a solitary unit that includes (i) the audio cassette tape, (ii) the picture scroll, and (iii) the plurality of rollers, the casing including a transparent viewing window located on a front surface to allow at least one pictorial scene of the plurality of pictorial scenes to be visible.

21. The interactive toy according to claim 19, wherein one scene of said plurality of pictorial scenes of said picture scroll is displayed in synchronism with playback of a segment of said pre-recorded audio corresponding to said pictorial scene provided by said audio cassette tape.

22. The interactive toy according to claim 21, wherein said magnetic tape includes a plurality of parallel channels of which a first channel of said plurality of parallel channels is selected as a default channel to playback said pre-recorded audio according to a first story line.

23. The interactive toy according to claim 22, wherein a second channel of said plurality of parallel channels is selected as said default channel to playback said prerecorded audio according to a second story line.

24. The interactive toy according to claim 23, wherein said base unit includes a controller;

a pictorial drive control mechanism coupled to said controller;

an audio cassette drive mechanism coupled to said controller, the audio cassette drive mechanism to rotate the at least one drive pin around the axis; and an audio speaker coupled to said audio cassette drive mechanism, said audio speaker outputs audible sound based on said default channel selected by said audio cassette drive mechanism.

25. The interactive toy according to claim 24, wherein said pictorial drive control mechanism includes a sensor coupled to said controller, said sensor being mounted within the base unit to monitor a longitudinal edge of the picture scroll and to transmit a control signal to said controller which, in turn, controls positioning of the pictorial scene.

26. An audio-visual cassette comprising:

a plurality of rollers including a first roller and a second roller, the first roller to rotate around a first axis of rotation;

a picture scroll coupled to the plurality of rollers;

an audio cassette tape including a pair of take-up reels and a magnetic tape having pre-recorded audio, at least one of the take-up reels being rotated, during playback, around a second axis of rotation orthogonal to the first axis; and a casing providing a unitary unit that includes (i) the audio cassette tape, (ii) the picture scroll, and (iii) the plurality of rollers, the casing including a transparent viewing window located on a front surface to allow a pictorial scene to be visible.

27. The audio-visual cassette according to claim 26, wherein said audio cassette tape is permanently attached to a rear surface of the casing.

28. The audio-visual cassette according to claim 26, wherein said magnetic tape includes a plurality of parallel channels of which a first channel of said plurality of parallel channels is selected as a default channel to playback said pre-recorded audio according to a first story line.

29. The audio-visual cassette according to claim 28, wherein a second channel of said plurality of parallel channels is selected as said default channel to playback said pre-recorded audio according to a second story line.

* * * * *

UNITED STATES PATENT AND TRADEMARK OFFICE
CERTIFICATE OF CORRECTION

PATENT NO. : 5,944,574  
APPLICATION NO. : 08/682266  
DATED : August 31, 1999  
INVENTOR(S) : Small et al.

Page 1 of 1

It is certified that error appears in the above-identified patent and that said Letters Patent is hereby corrected as shown below:

In Claim #1, Line #11, please delete "tap" and insert - - tape - -.

In Claim #1, Line #11, after "rotated" please insert - - , - -.

In Claim #1, Line #12, please delete "as" and insert - - axis - -.

In Claim #7, Line #2, please delete "tame" and insert - - tape - -.

In Claim #12, Line #4, please delete "scones" and insert - - scenes - -.

Signed and Sealed this

Twenty-second Day of August, 2006

JON W. DUDAS  
*Director of the United States Patent and Trademark Office*